July 11, 1967     H. E. SCHALLER     3,330,317
MEAT CUTTER HAVING ADJUSTABLE BLADES
Filed April 9, 1965
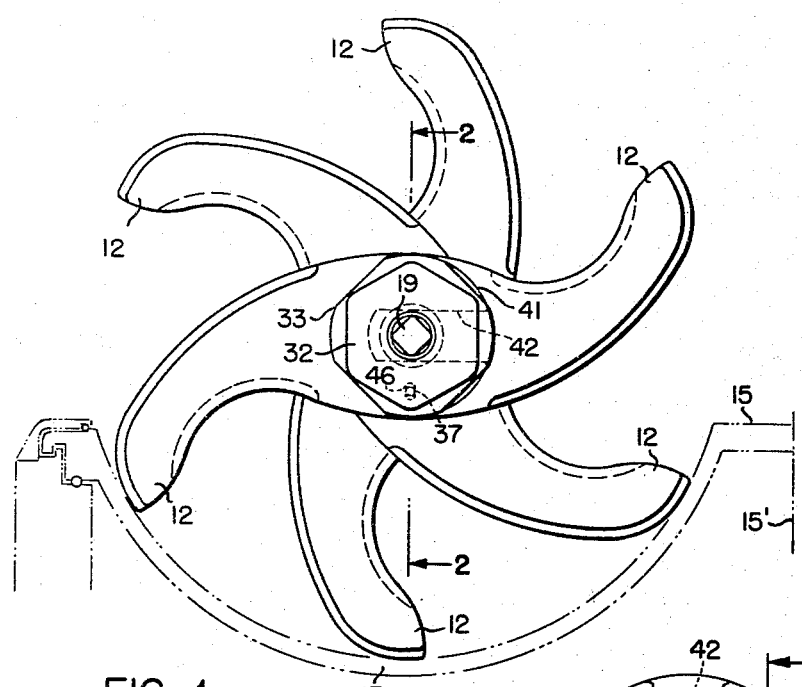
FIG. 1
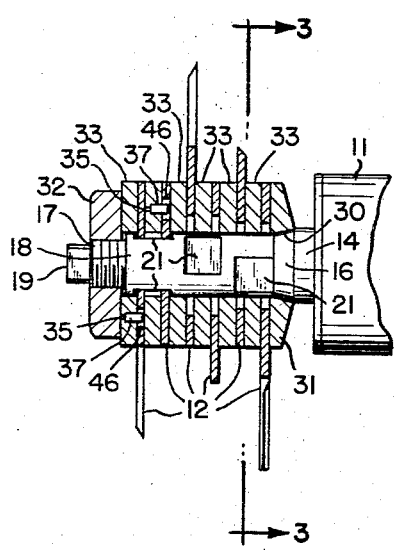
FIG. 2
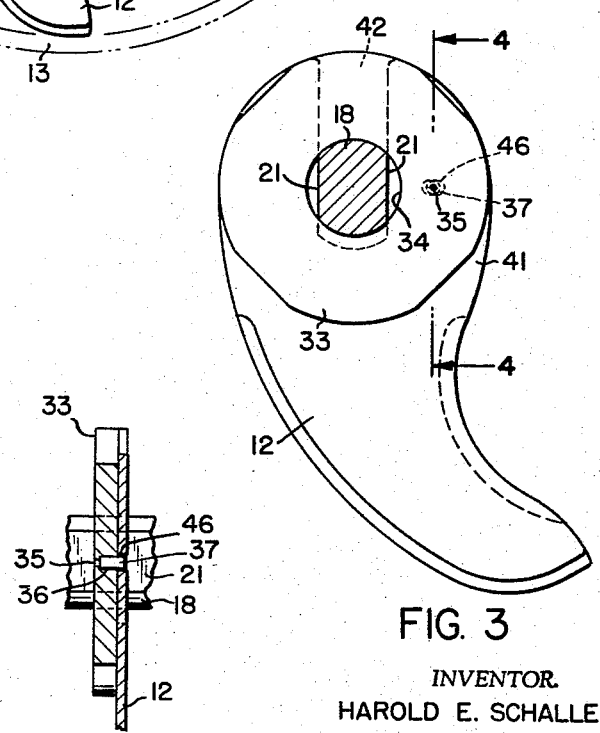
FIG. 3
FIG. 4
INVENTOR.
HAROLD E. SCHALLER
BY *B. E. Shlesinger*
ATTORNEY United States Patent Office 3,330,317
Patented July 11, 1967

3,330,317
MEAT CUTTER HAVING ADJUSTABLE BLADES
Harold E. Schaller, Buffalo, N.Y., assignor to Hobam,
Inc., Buffalo, N.Y., a corporation of New York
Filed Apr. 9, 1965, Ser. No. 446,803
1 Claim. (Cl. 146—67)

ABSTRACT OF THE DISCLOSURE

The cutter comprises a plurality of cutter blades, which project radially from a rotatable shaft and are spaced axially of an equi-angularly about the shaft. The blades are separated by interposed collars, which are rotatably adjustable on the shaft. Each collar carries a pin, which engages in a radial slot in the adjacent blade. The inner end of each blade is bifurcated, and is slidable over diametrally opposed flats on the shaft to guide the blade for radial adjustment on the shaft upon rotational adjustment of its associated collar. A nut that threads on the shaft clamps the blades and collars against movement on the shaft after adjustment. The pins prevent the blades from being thrown off by centrifugal force.

---

This invention relates to a meat cutting machine, and more particularly to a revolving knife assembly or cutter for such a machine.

In the manufacture of frankfurters, sausages, hamburg steak and like meat products, the meat has first to be chopped into fine pieces or particles. For chopping the meat it is usual to dump it into a revolving bowl, above which there is mounted a rotatable shaft which extends transversely over the bowl, and on which one or more cutter blades or knives are secured to extend down into the bowl. As the bowl revolves and the shaft rotates, the meat is carried into the paths of the rotating knives or blades to be sliced and chopped into fine pieces of the desired size.

One of the major disadvantages of prior meat cutters of this type is the difficulty in adjusting the knives or blades on the drive shaft, both when new and after sharpening, so that the tips of the blades will be in closely spaced relationship to the curved inner surface of the bowl during the cutting operation. Because of the need for adjustability there arises the danger that, if the blades are not secured properly to the shaft, they may become loose and fly off the shaft during its rotation, possibly injuring attendants and/or damaging the knives or the machine. This can be avoided by making the blades of hook-shape at their inner ends so that they hook over the shaft, with the result that centrifugal force will engage them only the more securely with the shaft. This construction, however, has the drawback that when a blade is sharpened, the inside of the hook has to be ground back also that a sharpened blade can be adjusted so that its tip is as close to the inside of the bowl as when the blade is new.

One object of this invention is to provide a knife assembly for a meat cutting machine of the character described which is constructed so that the blades are readily and easily adjustable to close tolerances in relation to the meat bowl, thereby to insure thorough and proper cutting of the meat.

Another object of the invention is to provide a knife assembly for a machine of the type described wherein the blades may be adjusted individually from a point outside the cutting zone.

Another object of the invention is to provide a knife assembly for a machine of the character described wherein reliable and positive means are provided for effectually clamping and retaining the knives or blades against accidental disconnection from their shaft during the cutting operation, thereby protecting the operator and preventing damage to the meat bowl and/or breakage of the blades.

Another object of the invention is to provide a cutter construction for a machine of the character described in which the only grinding that needs be done on the blades is for sharpening, and in which no other grinding is required to adjust the blades to maintain the desired distance between their cutting edges and the inside of the bowl.

Another object of the invention is to provide a blade assembly for a machine of the character described, which is designed so as readily to be assembled for use and disassembled for cleaning.

Another object of this invention is to provide an improved knife assembly of the type described which is relatively simple and inexpensive to manufacture.

Other objects of the invention will be apparent hereinafter from the specification and from the recital of the appended claim, particularly when read in conjunction with the accompanying drawing.

In the drawing:

FIG. 1 is an end view of a knife assembly made in accordance with one embodiment of this invention, and showing fragmentarily and in broken lines a cross sectional view of the rotating bowl in which the knife assembly works;

FIG. 2 is a fragmentary sectional view taken along the line 2—2 in FIG. 1 looking in the direction of the arrows, and showing part of the motor which drives the assembly;

FIG. 3 is an enlarged sectional view taken along the line 3—3 in FIG. 2 looking in the direction of the arrows, but omitting the drive motor; and FIG. 4 is an enlarged, fragmentary sectional view taken along the line 4—4 in FIG. 3 and looking in the direction of the arrows and showing how each cutter blade is secured adjustably to its collar and against being thrown off by centrifugal force.

Referring now to the drawing by numerals of reference, 11 (FIG. 2) denotes a motor for driving the cutting blades or knives 12 of the machine. The motor 11 is adapted to be mounted in conventional manner so that its armature shaft 14 is disposed above the annular trough 13 of a conventional cutting bowl 15, (broken lines in FIGS. 1 and 2) and at a right angle to the bowl axis 15'. Shaft 14 has along its length a truncated conical portion 16 (FIG. 2), an adjoining reduced diameter cylindrical portion 18 which terminates in an externally threaded section 17, and a generally square end 19.

Intermediate its ends, portion 18 has formed thereon three axially spaced pairs of flats 21. The two surfaces of a respective pair of flats 21 extend parallel to one another and are at diametrally opposite sides of the shaft. The different pairs of flats 21 are angularly about the axis of the shaft 120° from one another.

Removably secured on the conical part 16 of the shaft is a collar or bearing plate 31. This plate has a conical bore 30 fitting the conical portion 16 of the shaft. Mounted between this collar 31 and the nut 32, which is threaded on the section 17 of the shaft, are the knives 12 and a plurality of identical, axially-spaced, generally square-shaped collars 33. The knives or blades 12 are identical with one another, and alternate with the collars 33 along the length of the shaft.

Each collar 33 has a bore 34 (FIG. 3), which is adapted to fit over shaft portion 18, but which is slightly larger in diameter than the diameter of this portion of the shaft. Each collar has a recess 36 in it that is offset from the bore 34 of the collar. Press-fit into each recess 36 is a pin 37. Each pin projects out of its recess beyond one side face of the collar. A hole 35 in each collar aligned with recess 36, and opening onto the opposite side face of the collar, allows for insertion of a tool into the collar for driving associated pin 37 out of the collar should it become necessary to remove the same from the collar.

In the embodiment illustrated, six collars 33 are mounted on the shaft section 18 with their pins 37 facing toward the motor 11.

Each blade 12 has a hub portion 41, which is slotted as denoted at 42 to slip over opposed parallel flats 21 on the shaft portion 18. The hub portion 41 of each blade has a short slot 46 through it offset from its center or axis and disposed at right angles to slot 42 and adapted to receive the pin 37 of the adjacent collar 33. The working portions of the blades 12 project outwardly from the hub portions thereof and are sharpened in conventional manner with longitudinally convex sharply beveled cutting edges on their outer sides, and with longitudinally concave blunted bevel edges on their insides.

In assembly, a pair of blades 12 is slipped over each pair of flats 21, to project radially outwardly from diametrally opposite sides of the shaft. Successive pairs of blades 12 are thus angularly displaced 120° (FIG. 1) from one another about the axis of the shaft 14. Each collar 33 is mounted on the shaft 14 with the outer end of its pin 37 projecting into the slot 46 in the adjacent blade. The slots 42 by their engagement with the flats 21 hold the blades against rotation relative to the shaft, but permit radial adjustment of the blades on the shaft. This adjustment is effected by applying a wrench to the square-shaped portion of the perimeter of each collar 33, and rotating the latter on the shaft 14. As each collar 33 is rotated, its pin 37 slides in the slot 46 of its associated blade 12, thereby effecting radial adjustment of the associated blade relative to the shaft. When each of the independently adjustable blades 12 has been adjusted so that its tip is as close as desired to the bottom of the trough 13 (FIG. 1), the nut 32 is tightened to lock the collars 33 and 31, and the blades 12 tightly on the shaft, thereby also locking the blades 12 through the pin and slot connections 37–46 against being thrown outwardly by rotation of shaft 14.

From the foregoing it will be apparent that applicant has provided a relatively simple and inexpensive meat cutter having blades which are readily adjustable radially on the cutter shaft while precluding accidental release of the blades from the shaft while it is rotating. Moreover, such adjusting means eliminates many of the small, movable parts heretofore required and at the same time permits the blades 12 to be adjusted independently of one another merely by backing off the nut 32 and rotating the desired collar 33. Also, since the pins 39 are secured in the collars 33, which may be made substantially thicker than the blades 12, it is possible to employ pins having diameters large enough to preclude, substantially, shearing of the pins 37 during cutter operation.

While the invention has been described in connection with a specific embodiment thereof, it will be understood then that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claim.

Having thus described my invention, what I claim is:

A meat cutter comprising
- a rotatable shaft having thereon a plurality of axially spaced pairs of parallel, diametrally opposed flats, said pairs being equi-angularly spaced from one another about the axis of said shaft,
- a plurality of axially spaced annular collars mounted on said shaft,
- a plurality of cutting blades interposed between said collars and projecting at their outer ends radially beyond said collars,
- each of said blades being furcated at its inner end to straddle one of said pairs of flats, and each blade having in it a straight slot radial of said shaft and extending at right angles to its blade furcation,
- a pin secured in each of said collars and projecting parallel to said shaft and into the slot in the adjacent cutting blade, and
- releasable means for clamping said blades and said collars to said shaft for rotation therewith,
- each slot having a width approximately equal to the diameter of the pin which projects thereinto, and having a length several times said width, and
- each of said collars being rotatable relative to said shaft, when said clamping means is released, thereby to shift the associated cutting blade radially of said shaft in the direction determined by the pair of flats with which the blade furcation is engaged.

References Cited

UNITED STATES PATENTS

| 2,804,112 | 8/1957 | Schaller | 146—67 X |
| 2,854,045 | 9/1958 | Schmidt et al. | 146—67 X |

FOREIGN PATENTS

| 569,158 | 1/1924 | France. |
| 948,302 | 8/1956 | Germany. |
| 594,588 | 11/1947 | Great Britain. |

WILLIAM W. DYER, JR., *Primary Examiner.*

W. GRAYDON ABERCROMBIE, *Examiner.*